US012116823B2

(12) United States Patent
Durochik

(10) Patent No.: US 12,116,823 B2
(45) Date of Patent: Oct. 15, 2024

(54) GARAGE DOOR OPENERS AND METHODS OF OPERATING GARAGE DOORS

(71) Applicant: Daniel D. Durochik, St. John, IN (US)

(72) Inventor: Daniel D. Durochik, St. John, IN (US)

( * ) Notice: Subject to any disclaimer, the term of this patent is extended or adjusted under 35 U.S.C. 154(b) by 112 days.

(21) Appl. No.: 18/056,841

(22) Filed: Nov. 18, 2022

(65) Prior Publication Data

US 2023/0151671 A1 May 18, 2023

Related U.S. Application Data

(60) Provisional application No. 63/280,826, filed on Nov. 18, 2021.

(51) Int. Cl.
*E05F 15/72* (2015.01)
*E05F 15/77* (2015.01)

(52) U.S. Cl.
CPC .............. *E05F 15/72* (2015.01); *E05F 15/77* (2015.01); *E05Y 2400/66* (2013.01); *E05Y 2800/42* (2013.01); *E05Y 2900/106* (2013.01)

(58) Field of Classification Search
CPC ........... E05F 15/72; E05F 15/77; E05F 15/66; E05Y 2400/66; E05Y 2900/106; G08B 21/14
See application file for complete search history.

(56) References Cited

U.S. PATENT DOCUMENTS

| | | | | |
|---|---|---|---|---|
| 4,338,526 A * | 7/1982 | Martin | E05F 15/72 | 49/31 |
| 5,247,232 A * | 9/1993 | Lin | E05F 15/73 | 318/266 |
| 5,955,031 A * | 9/1999 | King, Jr. | E05F 15/72 | 49/199 |
| 7,183,933 B2 | 2/2007 | Dzurko et al. | | |
| 7,710,284 B2 * | 5/2010 | Dzurko | G08B 21/14 | 340/632 |
| 8,803,696 B1 * | 8/2014 | Dunyan | E05F 15/72 | 454/343 |
| 9,019,111 B1 * | 4/2015 | Sloo | F24F 11/30 | 706/14 |

(Continued)

FOREIGN PATENT DOCUMENTS

WO 2018170187 A1 9/2018

OTHER PUBLICATIONS

International Search Report and Written Opinion for International Application No. PCT/US2022/050374, dated Apr. 4, 2023 (12 pages).

*Primary Examiner* — Hoi C Lau
(74) *Attorney, Agent, or Firm* — Hartman Global IP Law; Gary M. Hartman; Domenica N. S. Hartman

(57) ABSTRACT

Garage door openers and methods of operating garage doors to reduce the risk of carbon monoxide poisoning. Such a garage door opener includes a motor unit configured to raise and lower an overhead garage door of a garage functionally coupled thereto, and an carbon monoxide (CO) detector that detects and measures a concentration of carbon monoxide gas in the garage. The CO detector directly delivers a signal to the motor unit in response to the detected concentration of carbon monoxide gas exceeding a predetermined CO threshold level for at predetermined duration, so that the garage door opener raises the overhead garage door with the motor unit.

20 Claims, 2 Drawing Sheets

(56) References Cited

U.S. PATENT DOCUMENTS

| | | | | |
|---|---|---|---|---|
| 9,183,736 | B2 * | 11/2015 | Sloo | G01N 33/0031 |
| 9,235,976 | B2 * | 1/2016 | Sloo | G08B 21/182 |
| 9,251,696 | B2 * | 2/2016 | Sloo | G08B 25/002 |
| 9,489,829 | B2 * | 11/2016 | Sloo | H05B 47/196 |
| 9,626,858 | B2 * | 4/2017 | Sloo | G08B 29/26 |
| 9,905,122 | B2 * | 2/2018 | Sloo | G08B 21/14 |
| 9,997,058 | B2 * | 6/2018 | Sloo | G08B 25/012 |
| 10,049,280 | B2 * | 8/2018 | Sloo | G08B 21/18 |
| 10,167,661 | B2 * | 1/2019 | Preus | E05F 15/77 |
| 10,253,545 | B2 * | 4/2019 | Liu | E05F 15/668 |
| 10,529,195 | B2 * | 1/2020 | Sloo | G01N 33/0031 |
| 10,540,864 | B2 * | 1/2020 | Sloo | G08B 21/18 |
| 10,546,469 | B2 * | 1/2020 | Peterson | G01N 27/121 |
| 10,755,544 | B2 * | 8/2020 | Combe | H04L 12/2823 |
| 10,890,024 | B2 * | 1/2021 | Combe | G08B 17/10 |
| 10,968,679 | B2 * | 4/2021 | Combe | A62C 2/12 |
| 10,991,213 | B2 * | 4/2021 | Sloo | G01V 8/10 |
| 11,208,839 | B2 * | 12/2021 | Lee | E05F 15/72 |
| 11,713,891 | B2 * | 8/2023 | Amundson | H04W 4/12<br>700/276 |
| 2005/0078003 | A1 * | 4/2005 | King | G08B 17/10<br>340/506 |
| 2005/0156546 | A1 * | 7/2005 | Keller | E05F 15/40<br>318/280 |
| 2007/0146150 | A1 * | 6/2007 | Calabrese | G08B 21/14<br>340/628 |
| 2007/0182574 | A1 * | 8/2007 | Dzurko | G08B 21/14<br>340/632 |
| 2009/0251325 | A1 * | 10/2009 | Smith | G08B 21/14<br>340/632 |
| 2011/0063101 | A1 * | 3/2011 | Cristoforo | G08B 21/14<br>700/275 |
| 2012/0260575 | A1 * | 10/2012 | Monaco | E05F 15/668<br>49/31 |
| 2012/0285088 | A1 * | 11/2012 | Nolte | E05F 15/72<br>49/31 |
| 2015/0096352 | A1 * | 4/2015 | Peterson | H04L 67/54<br>73/31.02 |
| 2015/0097663 | A1 * | 4/2015 | Sloo | G08B 21/12<br>340/501 |
| 2015/0097665 | A1 * | 4/2015 | Sloo | G01N 33/004<br>340/514 |
| 2015/0097684 | A1 * | 4/2015 | Sloo | G06T 7/70<br>340/628 |
| 2015/0097687 | A1 * | 4/2015 | Sloo | G01N 33/004<br>340/632 |
| 2015/0100167 | A1 * | 4/2015 | Sloo | H04L 67/54<br>700/278 |
| 2015/0254970 | A1 * | 9/2015 | Sloo | H05B 45/10<br>340/506 |
| 2016/0078751 | A1 * | 3/2016 | Sloo | G01N 33/0031<br>340/506 |
| 2016/0093180 | A1 * | 3/2016 | Fitzgibbon | H04N 7/188<br>348/155 |
| 2016/0123741 | A1 * | 5/2016 | Mountain | G08B 5/36<br>701/533 |
| 2016/0125730 | A1 * | 5/2016 | Sloo | G08B 5/36<br>340/506 |
| 2016/0232779 | A1 * | 8/2016 | Sloo | H04L 67/10 |
| 2017/0092115 | A1 * | 3/2017 | Sloo | G06V 20/46 |
| 2017/0177944 | A1 * | 6/2017 | Sloo | G08B 17/117 |
| 2018/0112454 | A1 * | 4/2018 | Preus | G08C 17/02 |
| 2018/0151006 | A1 * | 5/2018 | Huggins | G07C 9/20 |
| 2018/0158315 | A1 * | 6/2018 | Sloo | G01N 33/004 |
| 2018/0158318 | A1 * | 6/2018 | Huggins | E05F 15/681 |
| 2018/0160273 | A1 * | 6/2018 | Huggins | E05F 15/77 |
| 2018/0209199 | A1 * | 7/2018 | Liu | F21V 33/006 |
| 2018/0245395 | A1 * | 8/2018 | Huggins | E05F 15/668 |
| 2018/0264299 | A1 * | 9/2018 | Combe | G08B 21/14 |
| 2018/0266163 | A1 * | 9/2018 | Combe | G08B 17/10 |
| 2018/0266169 | A1 * | 9/2018 | Wray | E06B 3/924 |
| 2018/0266172 | A1 * | 9/2018 | Wray | E05F 17/004 |
| 2018/0322745 | A1 * | 11/2018 | Sloo | G01J 1/4204 |
| 2019/0172333 | A1 * | 6/2019 | Combe | G08B 21/16 |
| 2020/0168057 | A1 * | 5/2020 | Sloo | G08B 29/26 |
| 2020/0325717 | A1 * | 10/2020 | Didio | F21V 33/006 |
| 2021/0095514 | A1 * | 4/2021 | Madden | E04H 6/42 |
| 2021/0108818 | A1 * | 4/2021 | Amundson | G08B 21/14 |
| 2021/0233385 | A1 * | 7/2021 | Lovejoy | G08B 7/06 |
| 2021/0277702 | A1 * | 9/2021 | Lee | E05F 15/72 |
| 2023/0151671 | A1 * | 5/2023 | Durochik | E05F 15/72<br>49/31 |

* cited by examiner

GARAGE DOOR OPENERS AND METHODS OF OPERATING GARAGE DOORS

CROSS-REFERENCE TO RELATED APPLICATIONS

This application claims the benefit of U.S. Provisional Application No. 63/280,826 filed Nov. 18, 2021, the contents of which are incorporated herein by reference.

BACKGROUND OF THE INVENTION

The present invention generally relates to garage doors and methods for their operation. The invention particularly relates to a system that includes a garage door opener having an integrated carbon monoxide detector configured to open a garage door of a garage in the event that hazardous levels of carbon monoxide are detected in the garage.

Carbon monoxide (CO) is a colorless, tasteless and odorless gas that is virtually undetectable by humans. Elevated levels of carbon monoxide can be toxic to humans and animals depending on the concentration present in the air breathed thereby and length of exposure. For example, smaller concentrations can be harmful over longer periods of time while increasing concentrations require diminishing exposure times to be dangerous.

Common sources of carbon monoxide include engines fueled with gasoline, diesel, or other combustible fuel, notable examples of which include the combustion engines of automobiles and power generators. While carbon monoxide resulting from the operation of an automobile is less of a concern while driving, carbon monoxide can quickly accumulate within a garage in which an automobile engine is running, especially if the garage door is closed. This may occur in certain situations, including when an automobile is left running to warm the engine prior to travel, when an automobile is left running by accident, or when performing certain types of maintenance on an automobile engine. In situations such as these, the accumulation of carbon monoxide can easily become hazardous to occupants of the garage, including adults, children, and pets.

In the event of an electrical power outage, a portable gas generator may be used to provide a power source during the outage. Since outages may endure for hours if not days, the carbon monoxide produced by a gas generator located in a garage can pose a serious hazard to occupants of the garage as well as occupants of a house or other building attached to the garage. Other common sources of CO emissions in garages include garage furnaces, house furnaces and hot water heaters that are installed in garages, grills, small engines, fireplaces, stoves, and lanterns. Many homes built on slab foundations have furnaces and hot water heaters installed in the garage.

CO detectors are often installed within residential buildings to reduce the likelihood of carbon monoxide poisoning. CO detectors are designed to measure carbon monoxide levels over time and sound an alarm before or when dangerous levels of carbon monoxide accumulate in an environment, giving people adequate warning to safely ventilate the area and/or evacuate. However, it is less common, and not recommended by CO detector manufacturers, to install CO detectors in garages because CO detectors are not calibrated to operate properly in garage environments. Typical commercially-available CO detectors are designed to work in a controlled climate environment, for example, over a temperature range of about 40° F. to 100° F. (about 4° C. to about 40° C.), whereas temperatures in garages may range from temperatures far below freezing to temperatures well in excess of 100° F. (40° C.). Additionally, when starting a gas-powered vehicle inside a garage, typical commercially-available CO detectors may detect the initial burst of CO emissions associated with engine startup as a dangerous CO condition and result in a false positive detection.

Alarms generated by typical commercially-available CO detectors may also go unnoticed or unaddressed within a garage, especially if an adult is not present in the garage during the alarm or there is a sufficient noise level in the garage to obscure the sound of the alarm. To address this particular issue, U.S. Pat. No. 7,183,933 to Dzurko et al. proposes a garage door system that includes a standard and commercially-available CO detector used in combination with an acoustic detector that enables the audible alarm of the CO detector to be distinguished from other sounds.

In view of the above, it can be appreciated that there is an ongoing desire for systems or methods capable of reducing the danger of carbon monoxide poisoning within garages and capable of at least partly overcoming or avoiding the problems, shortcomings or disadvantages noted above.

BRIEF DESCRIPTION OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides garage door openers and methods of operating garage doors that promote safety of occupants of garages and attached dwellings by reducing the risk of carbon monoxide poisoning.

According to one aspect of the invention, a garage door opener is provided that includes a motor unit configured to raise and lower an overhead garage door of a garage functionally coupled thereto, and a detector module that contains a carbon monoxide (CO) detector configured to detect and measure a concentration of carbon monoxide gas in the garage and contains a smoke detector configured to detect a concentration of smoke in the garage. The garage door opener has a cavity at an exterior thereof, and the detector module is removably received within the cavity of the garage door opener. The detector module has an electrical connector for electrically connecting the detector module with the motor unit as the detector module is being inserted into the cavity. The CO detector generates a first signal in response to the concentration of carbon monoxide gas detected by the CO detector exceeding a CO threshold level for a first duration. The smoke detector generates a second signal in response to the concentration of smoke detected by the smoke detector exceeding a smoke threshold level. Optionally, the CO detector is programmed to have a second duration that is shorter than the first duration and below which the CO detector does not generate the first signal even if the CO threshold level is exceeded. The garage door opener is configured to raise the overhead garage door with the motor unit in response to receiving the first signal from the CO detector. If the CO detector generates the first signal and the smoke detector generates the second signal, the second signal operates to prevent the garage door opener from raising the overhead garage door with the motor unit.

According to another aspect of the invention, a method is provided for operating a garage door opener to raise and lower a garage door of a garage of a building. The method utilizes a detector module that contains a carbon monoxide (CO) detector configured to detect and measure a concentration of carbon monoxide gas in the garage and contains a smoke detector configured to detect a concentration of smoke in the garage. The detector module is removably received within a cavity of the garage door opener at an exterior thereof, and has an electrical connector for electrically connecting the detector module with the motor unit as the detector module is being inserted into the cavity. The CO detector generates a first signal in response to the concentration of carbon monoxide gas detected by the CO detector exceeding a CO threshold level for a first duration, and the smoke detector generates a second signal in response to the concentration of smoke detected by the smoke detector exceeding a smoke threshold level. The method includes detecting and measuring the concentrations of carbon monoxide gas and smoke in the garage with the CO detector and the smoke detector of the detector module. If the concentration of carbon monoxide gas in the garage measured by the CO detector does not exceed the CO threshold level for the first duration, the CO detector does not generate the first signal. If the concentration of carbon monoxide gas in the garage measured by the CO detector exceeds the CO threshold level for the first duration, the CO detector generates the first signal. If the concentration of smoke in the garage measured by the smoke detector exceeds the smoke threshold level, the smoke detector generates the second signal. The garage door opener raises the overhead garage door with the motor unit in response to receiving the first signal from the CO detector and, if the CO detector generates the first signal and the smoke detector generates the second signal, the second signal prevents the garage door opener from raising the overhead garage door with the motor unit.

Technical effects of the garage door opener and the method described above preferably include the ability to promote garage safety by reducing the likelihood of the presence of toxic levels of carbon monoxide within a garage.

Other aspects and advantages of this invention will be appreciated from the following detailed description.

DETAILED DESCRIPTION OF THE INVENTION

Figure 1:
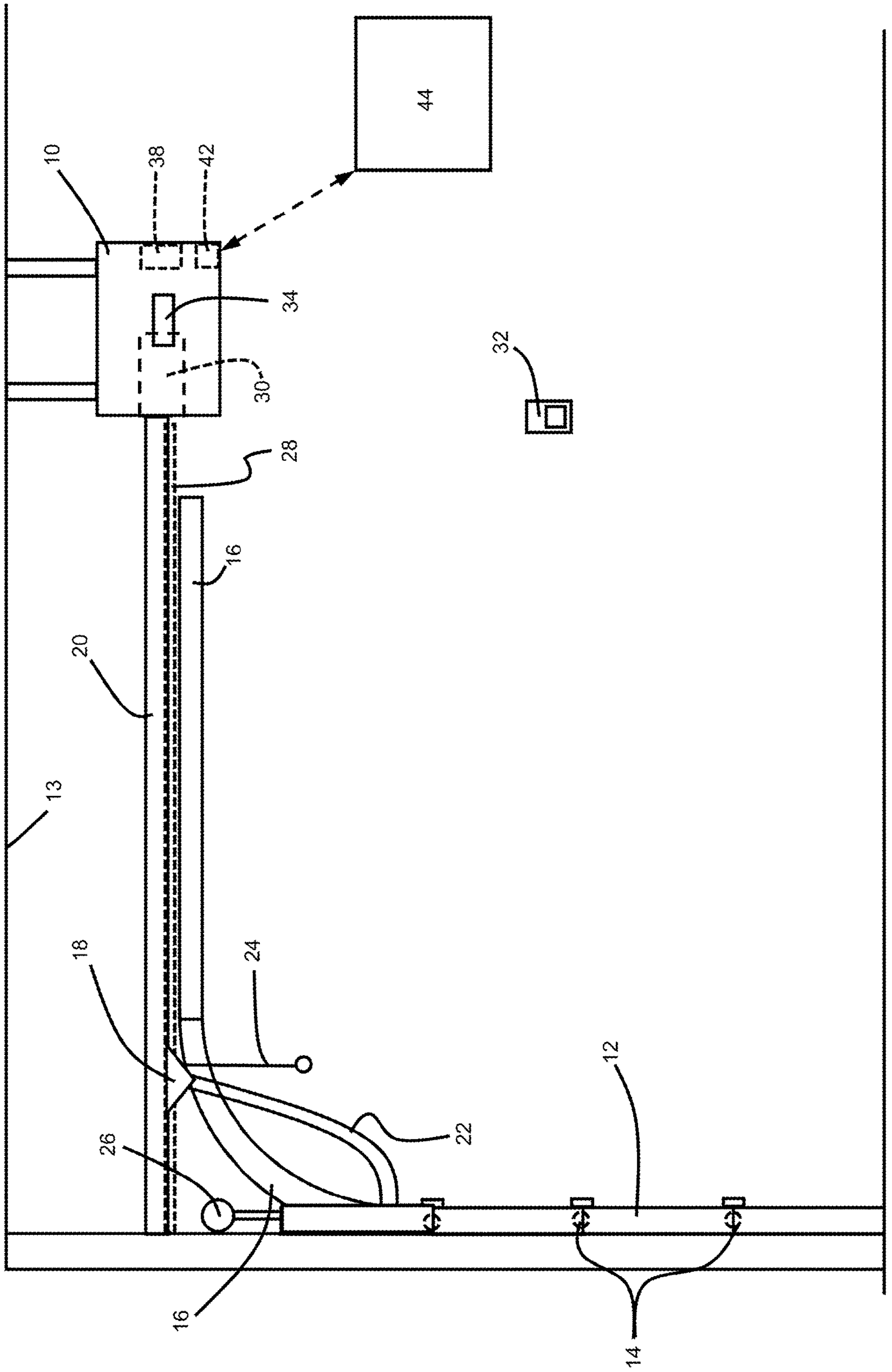
FIG. 1 schematically represents a garage door opener installed on a garage door system in accordance with certain nonlimiting aspects of the invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Disclosed herein are overhead garage door openers and methods of operation thereof. Such a garage door opener comprises a motor unit that includes a fully integrated detector modular that contains at least a carbon monoxide (CO) detector and a smoke detector. The CO detector is configured to measure and/or monitor carbon monoxide levels in an environment surrounding the CO detector and optionally generate or otherwise cause one or more alerts, alarms, or warnings to be generated in response to a measured carbon monoxide level exceeding a predetermined CO threshold level. In addition, if the predetermined CO threshold level is exceeded, under appropriate conditions the motor unit of the garage door opener is automatically activated to raise the garage door from a closed position to an open position (or a position therebetween). In this manner, the garage door opener is able to warn occupants of the garage of dangerous levels of carbon monoxide within the garage and open the garage door to potentially reduce the carbon monoxide levels within the garage.

FIG. 1 schematically represents a side elevational view of an exemplary garage with an overhead garage door system installed. The system is represented as including an overhead garage door opener 10 suspended from a ceiling 13 of the garage in accordance with a nonlimiting embodiment. The overhead garage door system includes various conventional components common to garages, garage doors, and systems for opening garage doors. The overhead garage door system includes a garage door 12 having a plurality of jointed panels wherein each panel segment includes one or more pairs of vertically spaced sets of rollers 14 that are guided in a pair of tracks 16 (one of which is depicted in the side view of FIG. 1). The tracks 16 are mounted adjacent the ceiling 13 as well as an opening of the garage that is closed with the garage door 12. The tracks 16 are configured to guide the garage door 12 between a closed position (i.e., substantially vertical and covering the opening as represented in FIG. 1) and an open position (i.e., substantially horizontal and adjacent the ceiling 13 of the garage) for allowing access to the interior of the garage.

A carriage 18 is slidably coupled to an overhead door lift pulley rail 20 and to the garage door 12 with an arm 22. Movement of the carriage 18 along the pulley rail 20 provides a lifting force necessary to transition the garage door 12 between the open and closed positions. The carriage 18 may be moved manually with an emergency release rope 24 or by operation of the garage door opener 10. A spring-biased lift mechanism 26 is functionally coupled to the garage door 12 to counterbalance the weight of the garage door 12 and thereby reduce the lifting force required to raise the garage door 12.

The garage door opener 10 may be coupled to the carriage 18 with a drive member 28 configured to pull and/or push the carriage 18 and thereby move the carriage 18 along the pulley rail 20. The garage door opener 10 includes a motor unit 30 configured to drive the drive member 28. Various components and configurations may be used for the motor unit 30, the drive member 28, and other components used for moving the carriage 18. As nonlimiting examples, the motor unit 30 may comprise an electric motor that draws power from an electrical circuit or from a battery system installed in the garage, and the drive member 28 may comprise a chain drive, a belt drive, a cable drive, or a screw drive system. Such systems are known in the art and therefore are not described in detail here. The garage door opener 10 may be activated to open or close the garage door 12 with a wireless remote control (not shown) or a wall-mounted controller 32 as known in the art.

Figure 2:
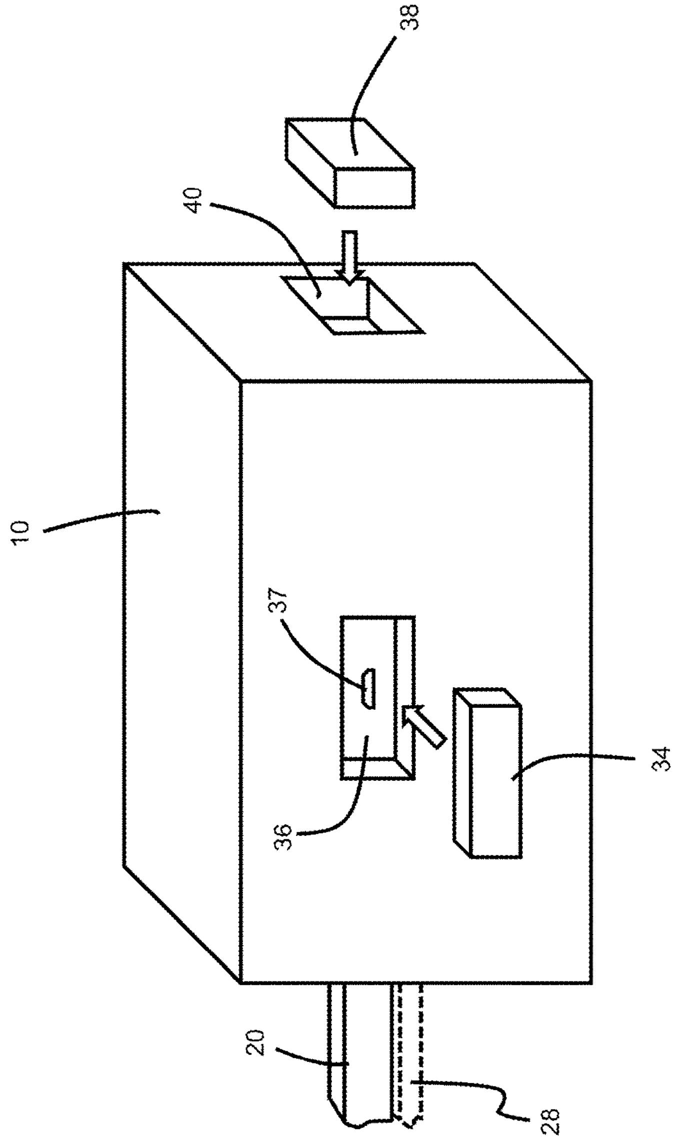
FIG. 2 schematically represents a detector module and a battery of the system that are each adapted to be readily installed in and removed from cavities located on the exterior of a motor unit of the system.
Figure 3:
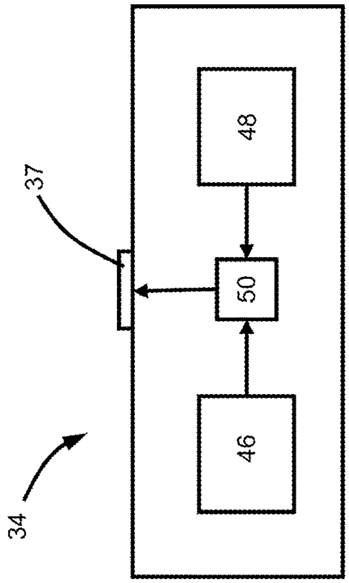
FIG. 3 schematically represents the detector module as containing a CO detector and a smoke detector.

As noted above, the garage door opener 10 is represented in FIG. 1 as including a fully integrated detector modular 34 that contains at least a carbon monoxide (CO) detector 46 and a smoke detector 48, which are schematically represented in FIG. 3. The CO detector 46 is configured to detect the presence of carbon monoxide gas, and the smoke detector 48 is configured to detect the presence of smoke. Each if the detectors 46 and 48 preferably operates and performs in a manner that meets or exceeds the requirements of certain government and/or industry safety standards for carbon monoxide alarms/detectors and smoke detectors, such as standards set by Underwriters Laboratories, Inc. and published by the United States Consumer Product Safety Commission. The detector module 34 is described as modular in the sense that the detector module 34 is a separate module that can be readily installed, removed, and replaced with respect to the garage door opener 10. In FIG. 2, the detector module 34 is represented as adapted to be easily installed in and removed from a receptacle, recess or cavity (hereinafter, cavity 36) at the exterior of a housing of the opener 10 that encloses the motor unit 30. In this manner, when the operational lives of the CO detector 46 and/or smoke detector 48 are met, the detector module 34 can be quickly replaced with a new replacement detector module 34 without accessing the interior of the housing of the opener 10. The detector module 34 and cavity 36 are equipped with complementary electrical connectors 37 for connecting the detector module 34 to the motor unit 30 as the detector module 34 is being inserted into the cavity 36. The detector module 34 may receive electrical power from one or more sources, preferably including a wired electrical connection for receiving power from an electrical system within the garage. As represented in FIG. 2, the detector module 34 may alternatively or in additional draw power from a separate backup source, such as a battery 38. In FIG. 2, the battery 38 is represented as capable of being readily installed in and removed from a cavity 40 at the exterior of the housing of the opener 10, with suitable electrical connectors (not shown) for connecting the battery 38 to the detector module 34 and optionally the motor unit 30.

The CO detector 46 and the smoke detector 48 may each comprise one or more sensors capable of measuring levels (e.g., concentration-time function) in an environment surrounding the detector module 34. Nonlimiting examples of suitable sensors include biomimetic sensors, electrochemical sensors, and semiconductor sensors. Because temperatures in the garage may range beyond the capabilities of conventional CO detectors, the CO detector 46 is specifically calibrated to operate over a relative wide temperature range, for example, temperatures ranging from about −20° C. to about 50° C., more preferably from about −30° C. to about 50° C.

The CO detector 46 generates at least a first signal and, depending on the intervention of the smoke detector 48 as discussed below, delivers the first signal to the garage door opener 10 and its motor unit 30 in response to the concentration of carbon monoxide gas detected by the CO detector 46 exceeding a predetermined CO threshold level for a predetermined first duration, which are preferably chosen as constituting in combination a dangerous exposure to carbon monoxide gas. The CO threshold level and duration at which the first signal is sent if exceeded may correspond, for example, to a carbon monoxide gas concentration of about 70 ppm for 60 to 240 minutes, or about 150 ppm for 10 to 50 minutes, or about 400 ppm for 4 to 15 minutes (UL 2034, section 39). According to a preferred aspect, the CO detector 46 is also operable to ignore an initial burst of high-level CO emissions, such as may occur when a gas-powered vehicle is started inside the garage. For this purpose, the CO detector 46 is preferably programmed to have a second duration that is shorter than the first duration and below which the CO detector 46 ignores and does not generate the first signal even if the CO threshold level is exceeded to avoid a false positive from an initial burst of CO. The second duration of the CO detector 46 may be programmable to adapt the CO detector 46 to the particulars (e.g., volume, ceiling height, etc.) of the garage in which it is installed. A suitable but nonlimiting second duration is believed to be about 4 minutes.

When the CO detector 46 detects a level of carbon monoxide gas that exceeds the predetermined CO threshold level for the predetermined first duration, the CO detector 46 may generate the first signal to cause the garage door opener 10 and/or one or more remote devices 44 to generate one or more audible and/or visual alerts, alarms, or warnings (collectively referred to herein as warning signals), as discussed below. Alternatively or in addition, and depending on the intervention of the smoke detector 48, the CO detector 46 delivers the first signal thereof directly to the garage door opener 10 and optionally directly to the motor unit 30 to cause the motor unit 30 to operate and automatically raise the garage door 12 from its closed position to its full open position or a position therebetween. As used herein, the term "directly" (and variations thereof) when used in reference to signals delivered by the CO detector 46 to the opener 10 and motor unit 30 refers to the lack of an intermediate device required to transform an audible output of the CO detector 46 to another type of signal and then communicate that transformed signal to the opener 10 or motor unit 30. In some embodiments the first signal delivered by the CO detector 46 to the motor unit 30 may cause the garage door opener 10 to raise the garage door 12 to a position between the closed position and the open position upon detection of the elevated carbon monoxide level with the CO detector 46. As a particular example, the garage door opener 10 may raise the garage door 12 such that the opening is uncovered to an extent sufficient to enable the ingress of air into the garage to reduce the carbon monoxide gas level, but less than sufficient to provide ease of physical access to the garage by unauthorized individuals. Optionally, the CO detector 46 may send a subsequent signal to the garage door opener 10 to cause the garage door opener 10 to close the garage door 12 if the CO detector 46 detects that the concentration of carbon monoxide gas has sufficiently dropped to a safe level and/or after a predetermined period of time.

In FIG. 3, outputs of the CO detector 46 and the smoke detector 48 are schematically represented as being directed to a decision block 50 through which their outputs pass before exiting the detector module 34. The decision block 50 is intended to functionally represent that, if the CO detector 46 generates the first signal thereof indicating that a level of carbon monoxide gas has been detected that exceeds the predetermined CO threshold level for the predetermined first duration, whether the first signal is delivered to the garage door opener 10 or its motor unit 30 to cause the motor unit 30 to raise the garage door 12 is dependent on the operation of the smoke detector 48. In particular, if the smoke detector 48 generates a signal (referred to herein as a second signal to distinguish from the first signal of the CO detector 46) in response to detecting a level of smoke that exceeds a predetermined smoke threshold level, the second signal of the smoke detector 48 preferably operates to intercept or block the first signal of the CO detector 46 to prevent the garage door opener 10 from raising the garage door 12 with the motor unit 30. The ability of the smoke detector 48 to effectively override the CO detector 46 serves to prevent the garage door opener 10 from allowing air to enter the garage in the event that the CO level detected by the CO detector 46 is the result of a fire that could be significantly accelerated if additional oxygen were to be made available through the open garage door.

The garage door opener 10 may provide additional optional functionality. The garage door opener 10 or the CO detector 46 preferably comprises a communication unit 42 that communicates (e.g., via wiring, WiFi, Bluetooth®, etc.) with one or more remote devices 44, as schematically represented in FIG. 1. As an example, the communication unit 42 may be configured for wireless communication (e.g., WiFi, Bluetooth®, etc.) with the one or more remote devices 44 directly and/or through a wireless network. The communication unit 42 may be configured to communicate with a remove device 44 that emits visual and/or audible warnings within a building, such as a house, that is associated with and possibly adjoins the garage in which the garage door opener 10 is installed. Alternatively or in addition, the communication unit 42 may be configured to allow for remote control of the garage door opener 10 and/or CO detector 46, remote monitoring of carbon monoxide gas levels, and/or generation of remote warning signal(s) in response to detection of the elevated carbon monoxide level by the CO detector 46. In some embodiments, the communication unit 42 may provide for the CO detector 46 and/or the garage door opener 10 to be controlled, programmed, and/or monitored by a remote device 44 having a computing capability, such as a personal computer or smart phone. For example, a user's smart phone may receive a notification in the event of the CO detector 46 detecting the elevated carbon monoxide level that exceeds the predetermined CO threshold level, the garage door opener 10 raising the garage door 12, and/or the CO detector 46 detecting a measured carbon monoxide level equal to or in excess of a user programed carbon monoxide level.

In some embodiments, a remote device 44 may be a security system of the building comprising the garage through a wired connection or the communication unit 42. In this example, detection of the elevated carbon monoxide levels may result in generation of warning signal(s) from one or more devices of the security system and/or notification to a remote monitoring and/or emergency service (e.g., security company, fire department, etc.).

In certain embodiments, remote devices 44 may comprise other or additional devices or systems of the building comprising the garage that are capable of mitigating the concentration of carbon monoxide gas within the garage through a wired connection or the communication unit 42. For example, detection of the elevated carbon monoxide levels may result in activation of an air ventilation system (e.g., a garage exhaust fan) capable of forcing the carbon monoxide saturated air from the garage and/or providing air to the garage from other locations.

While the invention has been described in terms of specific or particular embodiments, it should be apparent that alternatives could be adopted by one skilled in the art. For example, the garage door opener 10 and its components could differ in appearance and construction from the embodiments described herein and shown in the figures, functions of certain components of the garage door opener 10 could be performed by components of different construction but capable of a similar (though not necessarily equivalent) function, and various materials could be used in the fabrication of the garage door opener 10 and/or its components. As such, and again as was previously noted, it should be understood that the invention is not necessarily limited to any embodiment described herein or illustrated in the drawings.

The invention claimed is:

1. A garage door opener comprising:

a motor unit configured to raise and lower an overhead garage door of a garage functionally coupled thereto; and a detector module containing a carbon monoxide (CO) detector configured to detect and measure a concentration of carbon monoxide gas in the garage and containing a smoke detector configured to detect a concentration of smoke in the garage, the detector module being removably received within a cavity of the garage door opener at an exterior thereof, the detector module having an electrical connector for electrically connecting the detector module with the motor unit as the detector module is being inserted into the cavity, the CO detector generating a first signal in response to the concentration of carbon monoxide gas detected by the CO detector exceeding a predetermined CO threshold level for a predetermined first duration of time greater than zero, the smoke detector generating a second signal in response to the concentration of smoke detected by the smoke detector exceeding a smoke threshold level;

wherein the garage door opener is configured to raise the overhead garage door with the motor unit in response to receiving the first signal from the CO detector and, if the CO detector generates the first signal and the smoke detector generates the second signal, the second signal operates to prevent the garage door opener from raising the overhead garage door with the motor unit.

2. The garage door opener of claim 1, wherein the CO detector is operable to ignore an initial burst of high-level CO emissions as a result of being programmed to have a second duration that is shorter than the first duration and below which the CO detector does not generate the first signal even if the CO threshold level is exceeded.

3. The garage door opener of claim 1, wherein the CO detector has an operating range that includes all temperatures from −20° C. to 50° C.

4. The garage door opener of claim 1, wherein the garage door opener is configured to generate one or more audible and/or visual warning signals in response to the concentration of carbon monoxide gas in the garage exceeding the CO threshold level for the first duration.

5. The garage door opener of claim 1, wherein the garage door opener is configured to raise the overhead garage door in response to the concentration of carbon monoxide gas in the garage exceeding the CO threshold level for the first duration to a position in which the garage door is opened to less than the maximum extent thereof.

6. The garage door opener of claim 1, wherein after the garage door opener raises the overhead garage door in response to the concentration of carbon monoxide gas in the garage exceeding the CO threshold level for the first duration, the garage door opener lowers the garage door to a closed position upon detection of the concentration of carbon monoxide gas reducing to a safe level and/or after a predetermined period of time.

7. The garage door opener of claim 1, further comprising a communication unit configured to wirelessly send and receive data with one or more remote devices directly and/or indirectly through a wireless network.

8. The garage door opener of claim 1, further comprising a communication unit configured to allow a remote device to remotely control, monitor, and/or program the garage door opener and/or the CO detector.

9. The garage door opener of claim 1, further comprising a communication unit configured to initiate warning signal(s) on a remote device in response to the concentration of carbon monoxide gas in the garage as measured by the CO detector exceeding the CO threshold level for the first duration.

10. The garage door opener of claim 1, further comprising a communication unit configured to transmit a notification to a smart phone in response to the concentration of carbon monoxide gas in the garage as measured by the CO detector exceeding the CO threshold level for the first duration, the garage door opener raising the garage door, and/or the concentration of carbon monoxide gas in the garage as measured by the CO detector exceeding a user-programed carbon monoxide level.

11. The garage door opener of claim 1, further comprising a communication unit connected to a security system of a building comprising the garage, the garage door opener generating warning signal(s) with one or more devices of the security system in response to the concentration of carbon monoxide gas in the garage as measured by the CO detector exceeding the CO threshold level for the first duration.

12. The garage door opener of claim 1, further comprising a communication unit connected to a security system of a building comprising the garage, the garage door opener transmitting a notification to a remote monitoring service and/or emergency service in response to the concentration of carbon monoxide gas in the garage as measured by the CO detector exceeding the CO threshold level for the first duration.

13. The garage door opener of claim 1, further comprising a communication unit connected to a ventilation system of a building comprising the garage, the garage door opener activating the ventilation system to mitigate the concentration of carbon monoxide gas within the garage in response to the concentration of carbon monoxide gas as measured by the CO detector exceeding the CO threshold level for the first duration.

14. A method of operating a garage door opener having a motor unit configured to raise and lower a garage door of a garage of a building, the method comprising:

providing the garage door opener with a detector module containing a carbon monoxide (CO) detector configured to detect and measure a concentration of carbon monoxide gas in the garage and containing a smoke detector configured to detect a concentration of smoke in the garage, the detector module being removably received within a cavity of the garage door opener at an exterior thereof, the detector module having an electrical connector for electrically connecting the detector module with the motor unit as the detector module is being inserted into the cavity, the CO detector generating a first signal in response to the concentration of carbon monoxide gas detected by the CO detector exceeding a predetermined CO threshold level for a predetermined first duration of time greater than zero, the smoke detector generating a second signal in response to the concentration of smoke detected by the smoke detector exceeding a smoke threshold level;

detecting and measuring the concentrations of carbon monoxide gas and smoke in the garage with the CO detector and the smoke detector of the detector module; and if the concentration of carbon monoxide gas in the garage measured by the CO detector does not exceed the CO threshold level for the first duration, the CO detector does not generate the first signal;

if the concentration of carbon monoxide gas in the garage measured by the CO detector exceeds the CO threshold level for the first duration of time, the CO detector generates the first signal;

if the concentration of smoke in the garage measured by the smoke detector exceeds the smoke threshold level, the smoke detector generates the second signal;

wherein the garage door opener raises the overhead garage door with the motor unit in response to receiving the first signal from the CO detector and, if the CO detector generates the first signal and the smoke detector generates the second signal, the second signal prevents the garage door opener from raising the overhead garage door with the motor unit.

15. The method of claim 14, wherein the CO detector is operable to ignore an initial burst of high-level CO emissions as a result of being programmed to have a second duration that is shorter than the first duration and below which the CO detector does not generate the first signal even if the CO threshold level is exceeded.

16. The method of claim 14, wherein the CO detector has an operating range that includes all temperatures from −30° C. to 50° C.

17. The method of claim 14, further comprising lowering the garage door with the motor unit upon detection of the concentration of carbon monoxide gas reducing to a safe level as measured by the CO detector and/or after a predetermined period of time after the garage door opener raises the overhead garage door in response to the concentration of carbon monoxide gas in the garage exceeding the CO threshold level for the first duration.

18. The method of claim 14, further comprising remotely controlling, monitoring, and/or programming the garage door opener and/or the CO detector and/or the smoke detector with a remote device via a communication unit of the garage door opener.

19. The method of claim 14, further comprising initiating warning signal(s) on a remote device via a communication unit of the garage door opener in response to the concentration of carbon monoxide gas in the garage as measured by the CO detector exceeding the CO threshold level for the first duration and in response to the concentration of smoke in the garage as measured by the smoke detector exceeding the smoke threshold level.

20. The method of claim 14, further comprising transmitting a notification to a smart phone via a communication unit of the garage door opener in response to the concentration of carbon monoxide gas in the garage as measured by the CO detector exceeding the CO threshold level for the first duration, the concentration of smoke in the garage as measured by the smoke detector exceeding the smoke threshold level, the garage door opener raising the garage door, and/or the concentration of carbon monoxide gas in the garage as measured by the CO detector exceeding a user programed carbon monoxide level.

* * * * *